United States Patent
Sonoda (10) Patent No.: US 7,534,182 B2
(45) Date of Patent: May 19, 2009

(54) SPROCKET FOR CHAIN

(75) Inventor: Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 568 days.

(21) Appl. No.: 11/264,317

(22) Filed: Nov. 1, 2005

(65) Prior Publication Data

US 2006/0135304 A1     Jun. 22, 2006

(30) Foreign Application Priority Data

Dec. 17, 2004    (JP)    ............................. 2004-365964

(51) Int. Cl.
    *F16H 55/30*     (2006.01)
    *F16H 7/06*     (2006.01)
    *F16G 1/28*     (2006.01)

(52) U.S. Cl. .................. 474/152; 474/156; 474/202

(58) Field of Classification Search ................ 474/110, 474/111, 140, 135, 152–156, 160, 202, 203, 474/206

See application file for complete search history.

(56) References Cited

U.S. PATENT DOCUMENTS 5,921,878 A    7/1999   Young
6,375,589 B1 *   4/2002   Makino et al. ............. 474/148
7,128,673 B2 *   10/2006   Kubo et al. ................. 474/152
7,442,139 B2 *   10/2008   Kubo et al. ................. 474/152
2006/0084542 A1 *   4/2006   Kubo et al. ................. 474/206

FOREIGN PATENT DOCUMENTS

WO    WO 97/27411 A1    7/1997

OTHER PUBLICATIONS

U.S. Appl. No. 11/247,625, filed Oct. 7, 2005, Hiroki Ishida et al.
U.S. Appl. No. 11/269,002, filed Nov. 8, 2005, Aizoh Kubo et al.

* cited by examiner

*Primary Examiner*—Robert A Siconolfi
*Assistant Examiner*—Thomas W Irvin
(74) *Attorney, Agent, or Firm*—Howson & Howson LLP (57) ABSTRACT

In a sprocket for a chain transmission, teeth are disposed around the circumference of the sprocket at intervals. Arc-shaped tooth gap bottoms are formed between adjacent teeth, and each tooth gap bottom is continuous with the facing tooth surfaces of its adjacent teeth. Each tooth is formed so that its thickness is greater than the thickness of an ISO tooth form and gradually becomes thinner from the pitch line toward the tooth head. At engagement of the chain with the sprocket, a roller first comes into contact with a back tooth surface so that polygonal movement is suppressed.

1 Claim, 7 Drawing Sheets

SPROCKET FOR CHAIN

CROSS-REFERENCE TO RELATED APPLICATIONS

This application claims priority on the basis of Japanese patent application 2004-365964, filed on Dec. 17, 2004. The disclosure of Japanese patent application 2004-365964 is hereby incorporated by reference.

FIELD OF THE INVENTION

The invention relates to a sprocket for use with a roller chain, a bushing chain, a chain having sprocket-engaging pins instead of bushings, or a similar chain, and to a transmission utilizing the sprocket. More particularly, the invention relates to a sprocket design which suppresses noise generated as the chain engages a sprocket.

BACKGROUND OF THE INVENTION

Although the invention is applicable to sprockets for use with various types of chains, the invention will be described with reference to a sprocket used with a roller chain. A conventional sprocket generally has a tooth form defined in ISO (International Organization for Standardization) 606:1994(E), the tooth form being hereinafter referred to as "ISO tooth form." The ISO tooth form is depicted in FIG. 6, and FIG. 7 shows a roller chain engaging a sprocket having the ISO tooth form.

Figure 6:
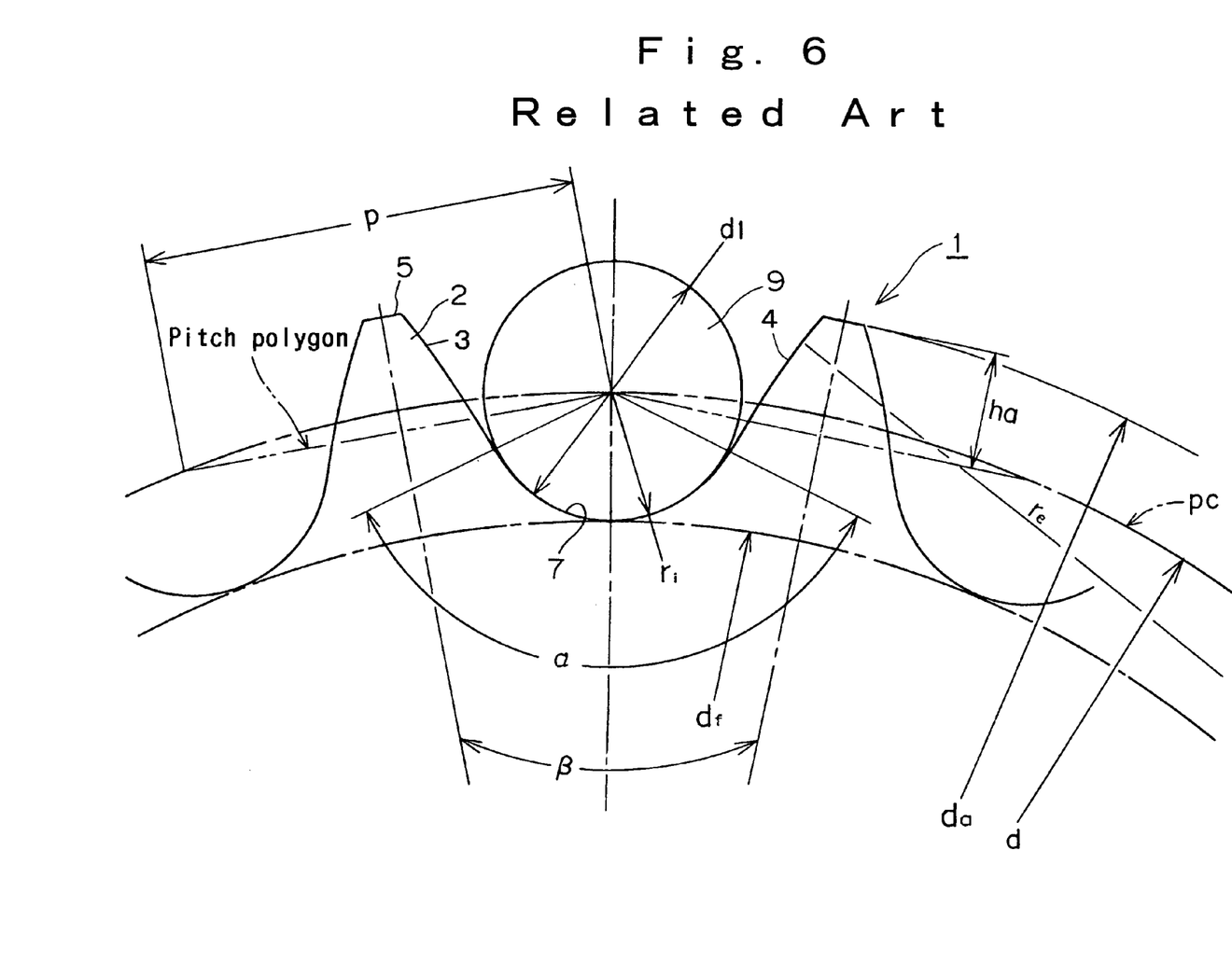
FIG. 6 is an elevational view of a part of a sprocket in which the teeth have an ISO tooth form.
Figure 7:
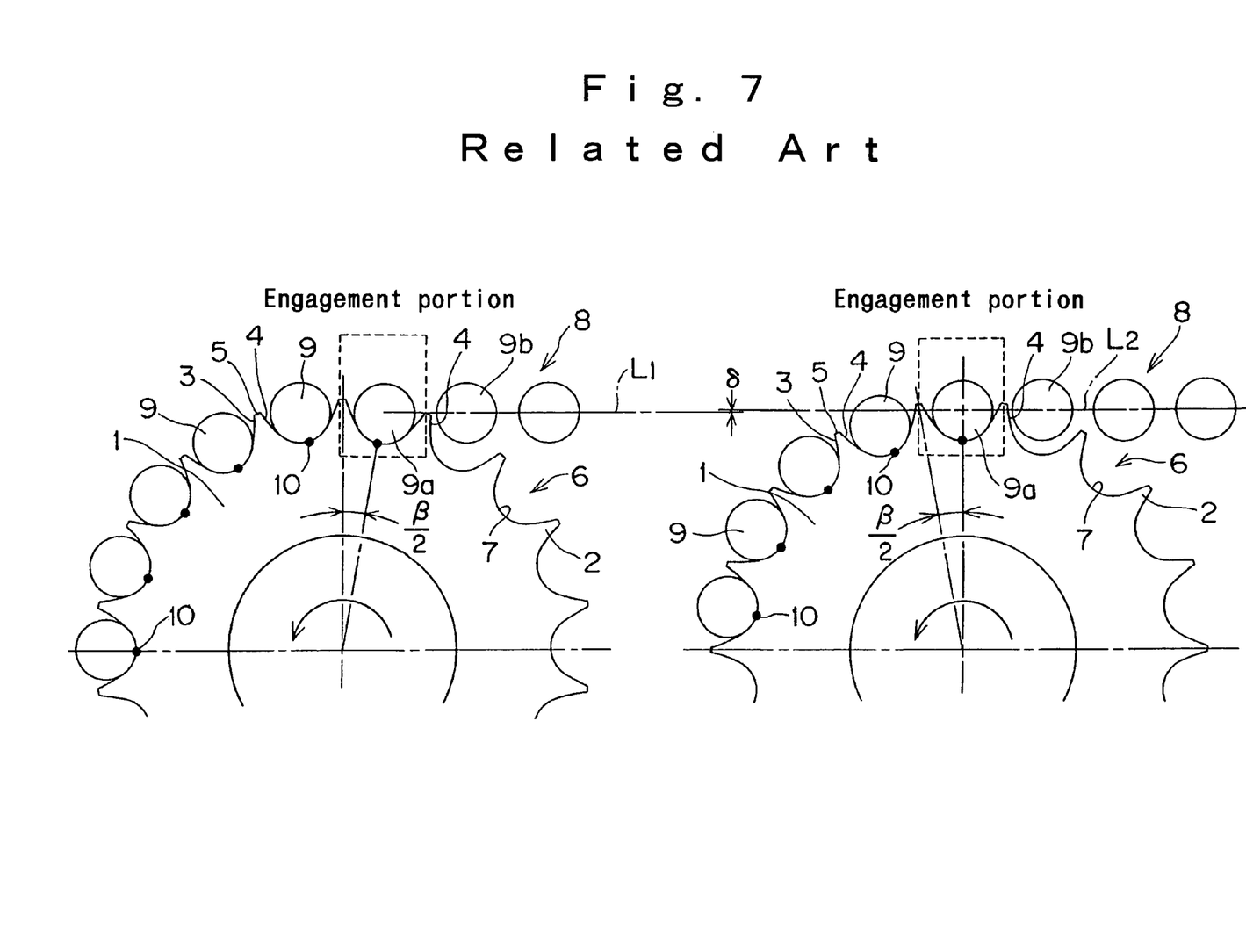
FIG. 7 is a schematic view showing the engagement between the rollers and a sprocket of a roller chain transmission in which the sprocket has an ISO tooth form.

The parameters of the ISO tooth form, as shown in FIG. 6, are defined in ISO 606:1994(E) as follows:

$$d = p/\sin(180°/z)$$

$$d_f = d - d_1$$

$$r_e(\max) = 0.12 d_1 (Z+2)$$

$$r_i(\min) = 0.505 d_1$$

$$\alpha(\max) = 140° - 90°/z$$

$$r_e(\min) = 0.008 d_1 (Z^2 + 180)$$

$$r_i(\max) = 0.505 d_1 + 0.069 d_1^{1/3}$$

$$\alpha(\min) = 120° - 90°/z$$

$$\beta = 360°/z$$

wherein
  p is the chain pitch (chord pitch),
  d is the diameter of pitch circle,
  $d_1$ is the outer diameter of the chain roller,
  $r_i$ is the radius of the arc of the tooth gap bottom,
  $r_e$ is the radius of the tooth surface,
  $d_f$ is the root diameter, i.e., the diameter of an inscribed circle tangent to the tooth gap bottom,
  z is the number of sprocket teeth, and
  α is the roller seating angle, i.e., the angle of the tooth bottom arc.

β is the tooth pitch angle as shown in FIG. 6, pc is the pitch line of the sprocket, and ha is the height of a tooth head, as measured from the pitch polygon.

As apparent from the above expressions, in the ISO tooth form shown in FIG. 6, the tooth gap bottom 7 is in the form of an arc having a radius $r_i$, which is slightly larger than the radius ($d_1/2$) of chain roller 9. The front and back tooth surfaces 3 and 4, which are both continuous with an arcuate tooth gap bottom 7, are each in the form of an arc of radius $r_e$. The diameter $d_f$ of the tooth gap bottom circle is equal to the difference between diameter d of the pitch circle pc and the diameter $d_1$ of the roller. The diameter $d_f$ of the tooth gap bottom circle is also substantially equal to the difference between the diameter d of the pitch circle pc and twice the radius $r_i$ of the tooth bottom circle.

As is generally known, when a roller chain is engaged with spaced sprockets to form a transmission, and the driving sprocket has an ISO tooth form, the chain undergoes polygonal movement upon engagement with the driving sprocket, and the polygonal movement results in chordal vibration.

As shown in FIG. 7, a roller 9a of chain 8 engages a tooth gap 6 to contact a tooth gap bottom 7 at an engagement portion. However, the adjacent following roller 9b does not come into contact with a back tooth surface 4 before it reaches the engagement portion. $L_1$ designates the track of travel of the chain as it approaches the engagement portion. Track $L_1$ is at its lower limit in the left side view in FIG. 7. When the sprocket 1 rotates by a half the pitch angle, that is, through an angle β/2, the tooth gap bottom 7, with which roller 9a is engaged, is raised, and the track $L_2$ is correspondingly raised, through a distance δ, to an upper limit as depicted on the right side view in FIG. 7. Thus, as the tooth gap bottom 7 moves up and down in FIG. 7, the chain 8 undergoes polygonal movement corresponding to the rotation of the pitch polygon shown in FIG. 6, and the approaching part of the chain is moved up and down as a result of the polygonal movement.

As a result, even if the sprocket 1 rotates at a constant speed, polygonal movement causes the chain to pulsate, and the pulsating movement causes chordal vibration, which generates noise. If the cycle of the polygonal movement resonates with the natural vibration of the approaching chain span, a chordal vibration of larger magnitude is generated. Polygonal movement also results in intermittent changes in the speed of the chain 8. As shown in FIG. 7, when a sprocket having the ISO tooth form is rotated, the contact position 10 between the tooth gap bottom 7 and the chain roller 9 does not move relative to the sprocket.

A sprocket composed of teeth having an asymmetrica tooth form has been proposed in order to suppress chordal vibration due to a polygonal movement of a roller chain. In the proposed sprocket, the front tooth surfaces (that is, the front surfaces with reference to the rotational direction of the sprocket) are asymmetric in relation to the back tooth surfaces. In a transmission utilizing such a sprocket, polygonal movement of the chain is suppressed by first bringing a roller of the chain into contact with a front tooth surface at an engagement location. Such a sprocket is described in U.S. Pat. No. 5,921,878, dated Jul. 13, 1999.

In a roller chain transmission in which the driving sprocket has an ISO tooth form, since the roller engages a tooth gap bottom directly, without coming into contact with either a front tooth surface or a back tooth surface, impact noise is also generated.

Polygonal movement, resulting chordal movement, vibration noise, intermittent changes in speed, and impact noise, occur not only in transmissions utilizing roller chains, but also in chain transmissions in which the chains have no rollers, and instead, pins or bushings come into direct contact with the sprocket. Additionally, although the transmission in U.S. Pat. No. 5,921,878 is intended to address the problems caused by polygonal movement, there is room for improvement in the sprocket disclosed in that patent.

Accordingly, objects of this invention are to solve the above-mentioned problems encountered in prior art chain transmissions, and to provide a sprocket, and a chain transmission device using the sprocket, which suppress polygonal movement of the chain, reduce noise, and prevent intermittent changes in speed.

SUMMARY OF THE INVENTION

The sprocket according to the invention has a plurality of sprocket teeth disposed circumferentially at intervals. The facing tooth surfaces of adjacent teeth are connected by arc-shaped tooth gap bottoms. When the centers of the tooth gap bottoms correspond with the centers of the tooth gap bottoms of teeth having an ISO tooth form, the tooth thickness, of inner portions of the sprocket teeth in the vicinity of the intersections of lines defining the angle subtended by the tooth gap bottom arcs of the ISO tooth form with the tooth surfaces, is thinner than the tooth thickness of the ISO tooth form, and the tooth thickness of outer portions of the teeth extending from the thinner inner portions to the tooth heads is thicker than the tooth thickness of said ISO tooth form, and gradually becomes thinner, proceeding from the sprocket pitch line to the tooth heads. Preferably the heights of the tooth heads of the sprocket teeth are greater than the height of the tooth heads of teeth having said ISO tooth form.

In a chain transmission, when a chain roller, bushing, pin or the like first comes into contact with a back tooth surface at an engagement location, the approaching portion of the chain is held at the upper limit of its track by contact with this back tooth surface. As a result, polygonal movement of the chain, on engagement with the sprocket, is suppressed, and chordal vibration and intermittent changes in speed are suppressed. Furthermore, the point of contact between a tooth, and a roller, pin, bushing, or the like, gradually moves toward the tooth gap bottom so that impact noise at the engagement portion is also suppressed.

The suppression of polygonal movement at engagement of the chain with the sprocket is enhanced by making the heights of the tooth heads greater than the height of the tooth head of an ISO tooth form. In this way, the rollers, bushings, pins or the like, are reliably brought into contact with back tooth surfaces near the tooth head. The ability of the sprocket to suppress polygonal movement and chordal vibration, and to suppress intermittent changes in speed, are particularly advantageous when the sprocket is utilized in a power transmission as a driving sprocket.

DETAILED DESCRIPTION OF THE PREFERRED EMBODIMENTS

In accordance with the invention, by making the thickness of the outer portions of the sprocket teeth greater than the thickness of an ISO tooth form, and making the height of the sprocket's tooth heads greater than the height of an ISO tooth form, the chain roller is first brought into contact with a back tooth surface (i.e., the back side of the tooth with reference to the rotational direction of the sprocket), to suppress polygonal movement of the chain, and chordal vibration and intermittent changes in the speed of the chain due to polygonal movement.

Figure 1:
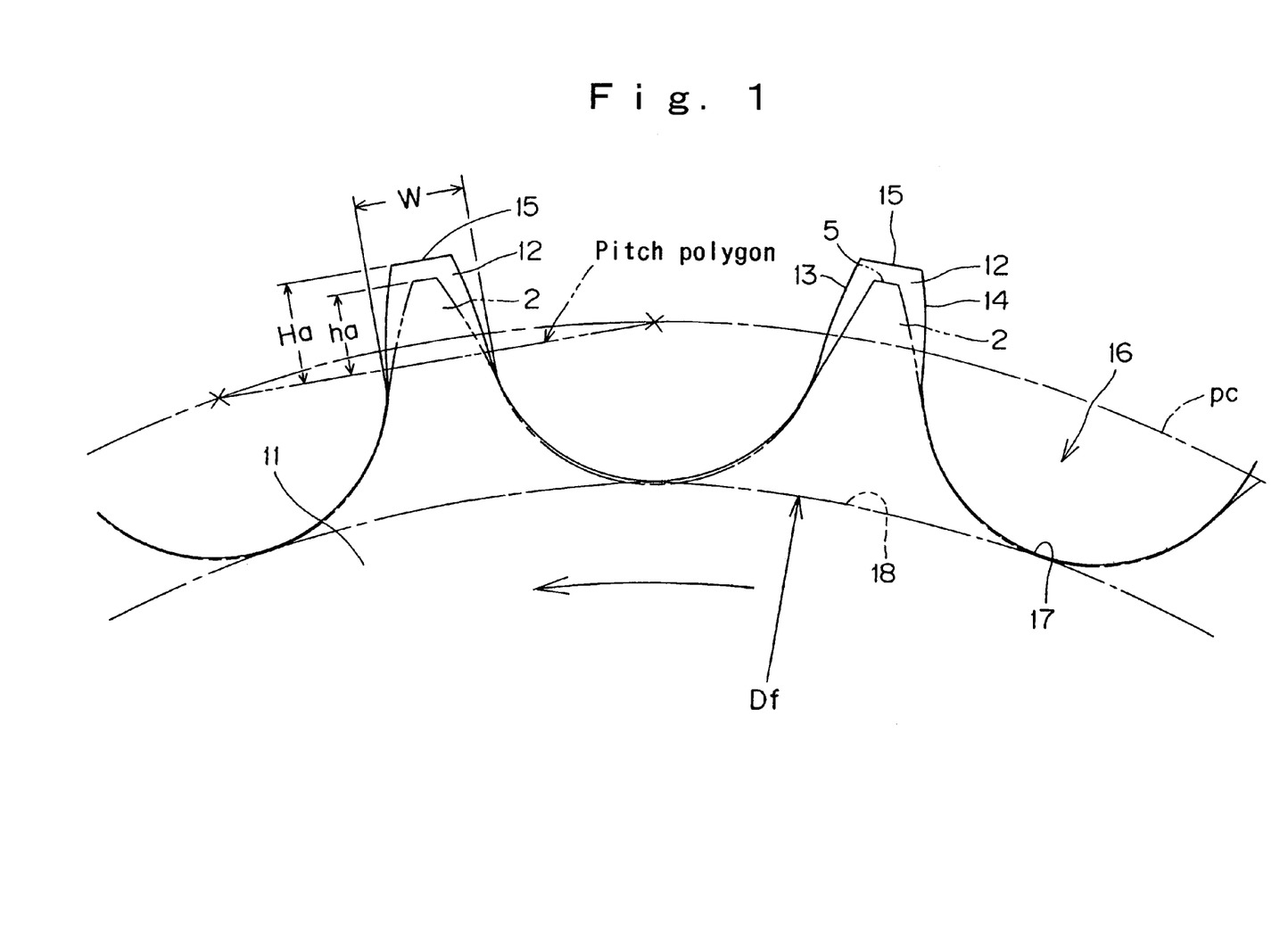
FIG. 1 is a schematic elevational view of a part of a sprocket according to the invention.

As shown in FIG. 1, in sprocket 11, each of the sprocket teeth 12, disposed at intervals on the outer circumference of a sprocket, is defined by opposite tooth surfaces 13 and 14, surface 13 being a front tooth surface and surface 14 being a back tooth surface with reference to the rotational direction of the sprocket indicated by the arrow. A tooth gap 16 is formed between adjacent teeth 12 for engagement with a chain roller. The tooth gap 16 is formed by a front surface 13 of a tooth, a back surface 14 of a next preceding tooth, and an arc-shaped tooth gap bottom 17.

Figure 3:
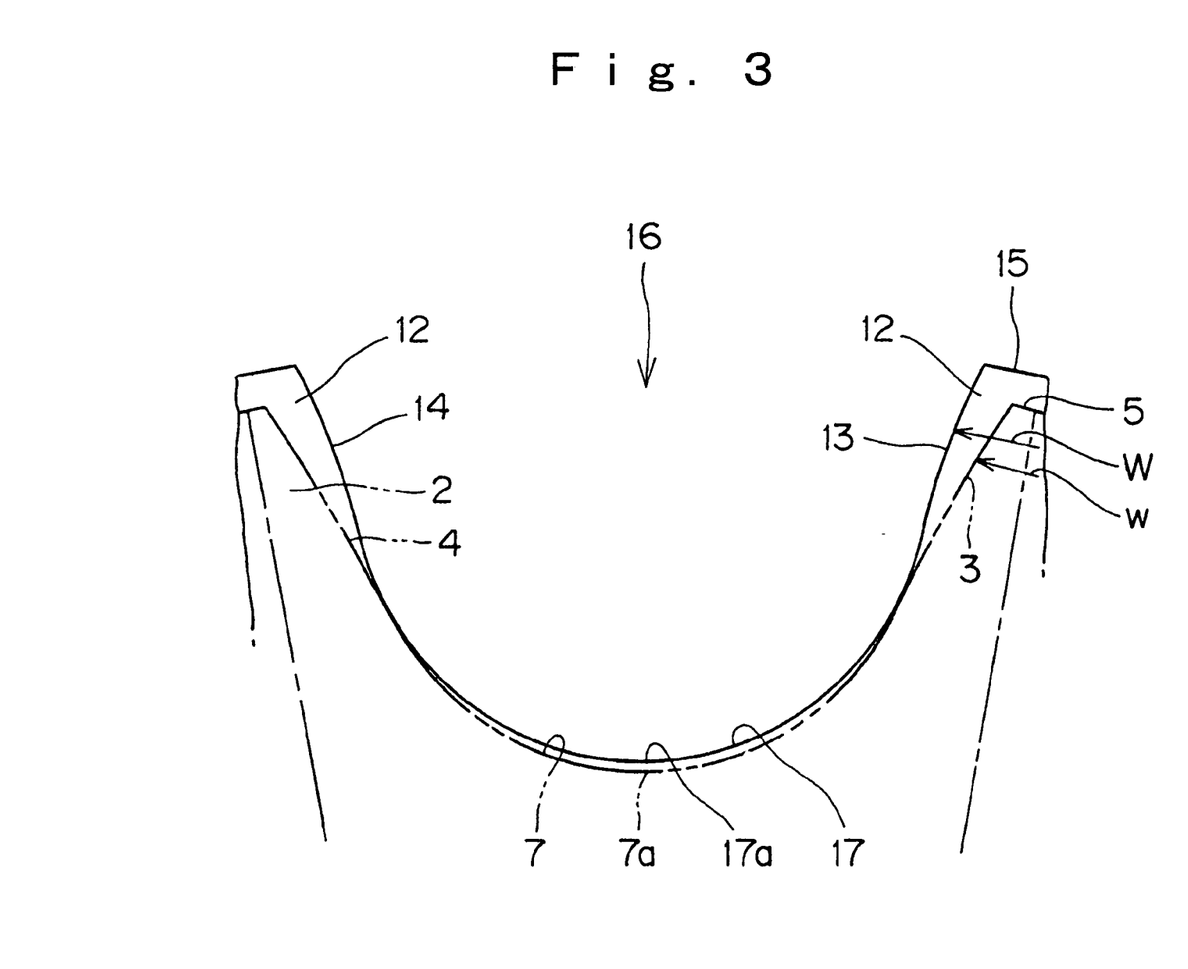
FIG. 3 is an enlarged elevational view showing details of the tooth gap of the sprocket.
Figure 4:
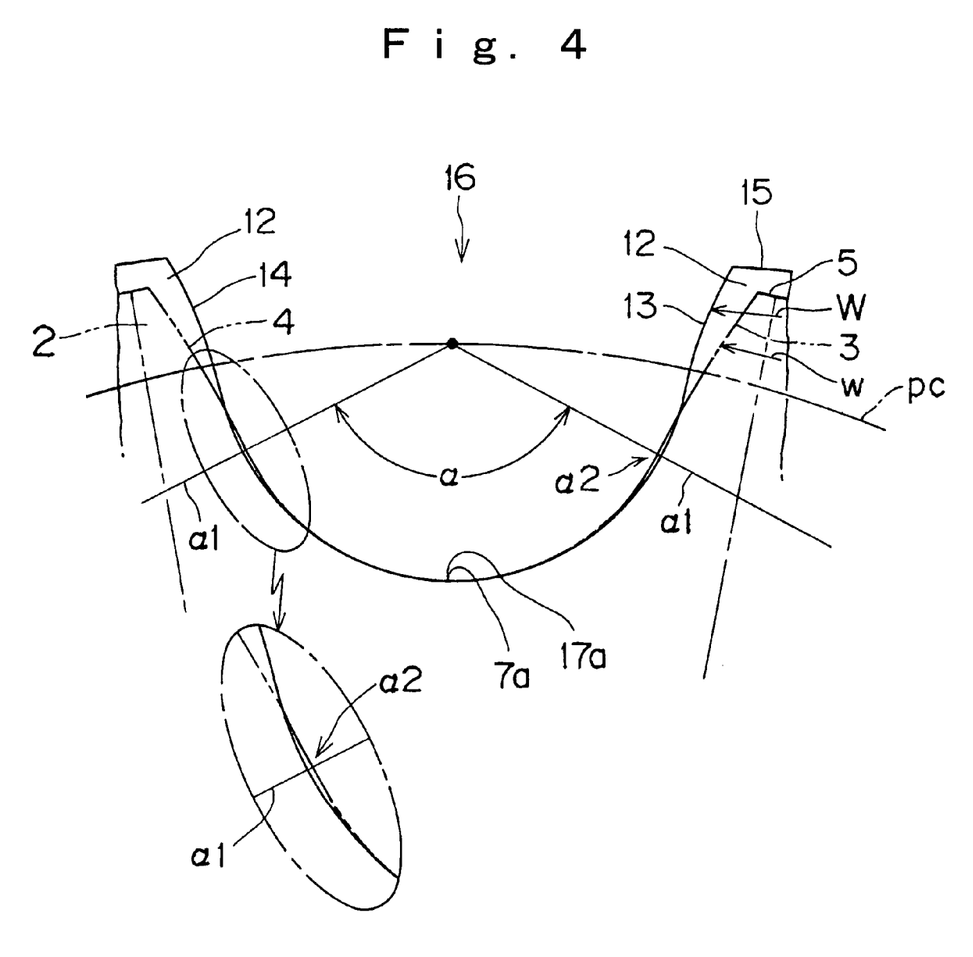
FIG. 4 is an enarged elevational view of the details of a tooth gap of a sprocket in which the central portion of the tooth gap bottom conforms to the central portion of a tooth gap bottom in an ISO tooth form.

As shown in FIG. 4, the lines $\alpha 1$, defining the angle $\alpha$ of the arc of the tooth gap bottom, intersect the teeth at location $\alpha 2$. When the central portion 17a of the tooth gap bottom conforms with the central portion 7a of a tooth gap bottom of an ISO tooth form, the tooth thickness W, in the vicinity of $\alpha 2$ is thinner than the tooth thickness w of the ISO tooth form. On the other hand, at a location a short distance outward from location $\alpha 2$, the tooth thickness W becomes greater than the tooth thickness w of the ISO tooth form. However, the tooth thickness W gradually becomes thinner, proceeding outward from the pitch line pc to the tooth head. Referring again to FIG. 1, the height Ha of the tooth heads, measured from the pitch polygon, is set so that adjacent rollers can maintain a linear track as one of the adjacent rollers begins to engage the sprocket. This linear track is depicted at $L_{12}$ in FIG. 2. The height Ha of the tooth head of the tooth 12 is higher than the height ha of the tooth head of the ISO tooth form, and, as shown in FIG. 3, the radius of the arcuate tooth gap bottom 17 is larger than the radius of a tooth gap bottom of the ISO tooth form. Consequently, the center portion 17a of the tooth gap bottom 17 is a short distance radially outward from the center portion 7a of the tooth gap bottom 7 of the ISO tooth form, and the diameter $D_{fi}$ of the inscribed circle 18 (FIG. 1) tangent to the tooth gap bottoms, is increased. As a result the sprocket pitch can be made larger than the chain pitch.

Figure 2:
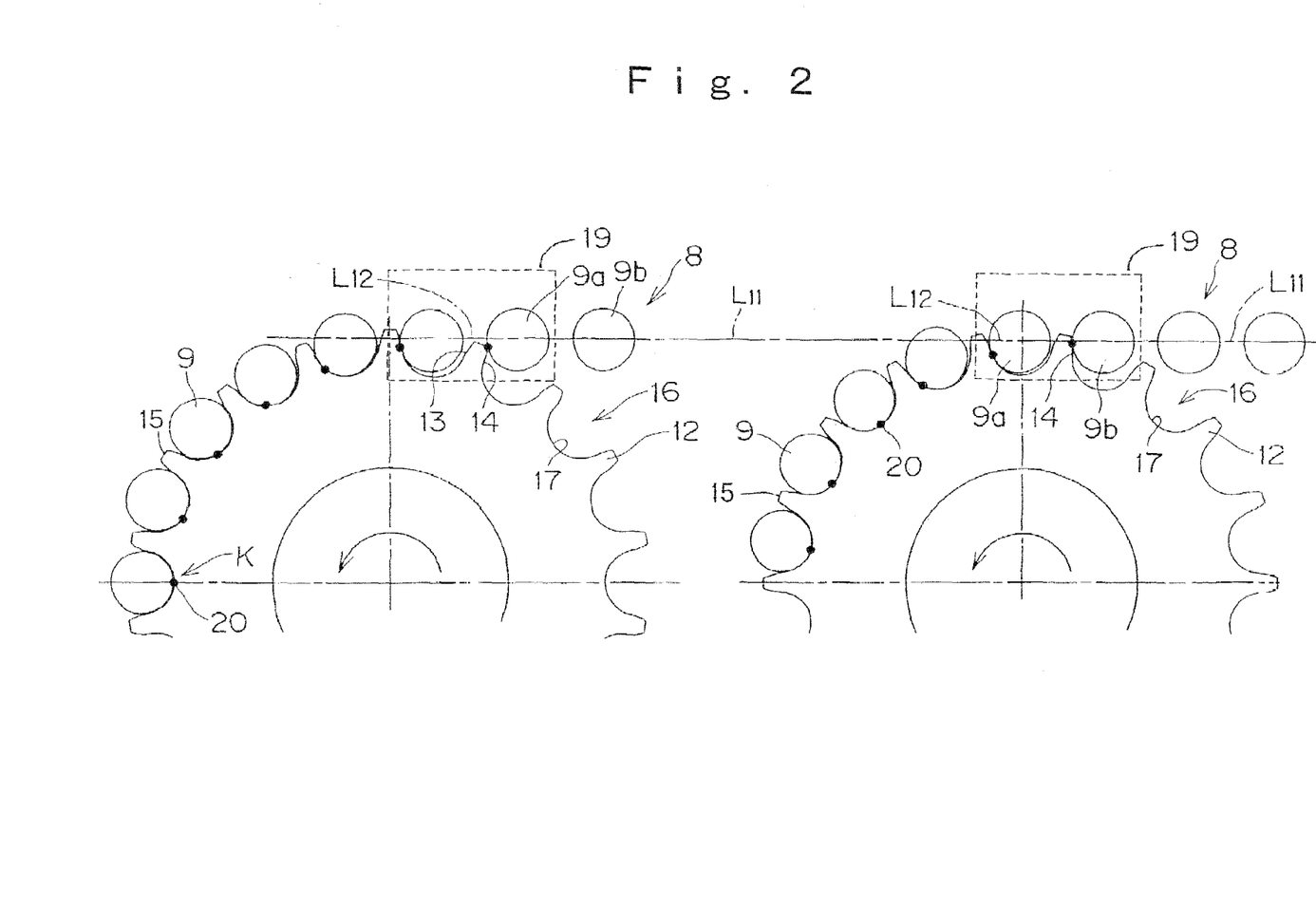
FIG. 2 is a schematic view of a portion of a roller chain transmission in accordance with the invention, showing the engagement between the rollers and a sprocket.

When the sprocket 11 is used as the driving sprocket of a chain transmission, as shown in the left portion of FIG. 2, a chain roller 9a, in an engagement portion 19 of the chain 8, first comes into contact with a back tooth surface 14 in the vicinity of the tooth head, without contacting a front tooth surface 13 as in the case of a conventional chain transmission. Movement of the roller 9a to the tooth gap bottom is therefore restricted. Subsequently, as the sprocket is rotated by a half pitch, the following roller 9b is brought into contact with a back tooth surface 14 of the adjacent tooth 12, as shown in the right portion of FIG. 2, and movement of roller 9b toward the tooth gap bottom is also restricted.

As the sprocket 11 rotates, the contact position 20 (which is ordinarily a line of contact, but seen as a point of contact in a sectional view) between the roller 9 and the tooth surface 14 moves gradually to the tooth bottom 17, and reaches the center 17a (FIGS. 3 and 4) of the tooth gap bottom in the vicinity of point K (FIG. 2), the midpoint between the engagement position and the position at which the chain disengages from the sprocket 11. Although not shown, as the sprocket 11 continues to rotate, after the roller 9 passes through point K, it is gradually brought into contact with a front tooth surface 13 on the opposite side of the tooth gap, so that the contact position 20 moves toward a tooth head 15.

Figure 5:
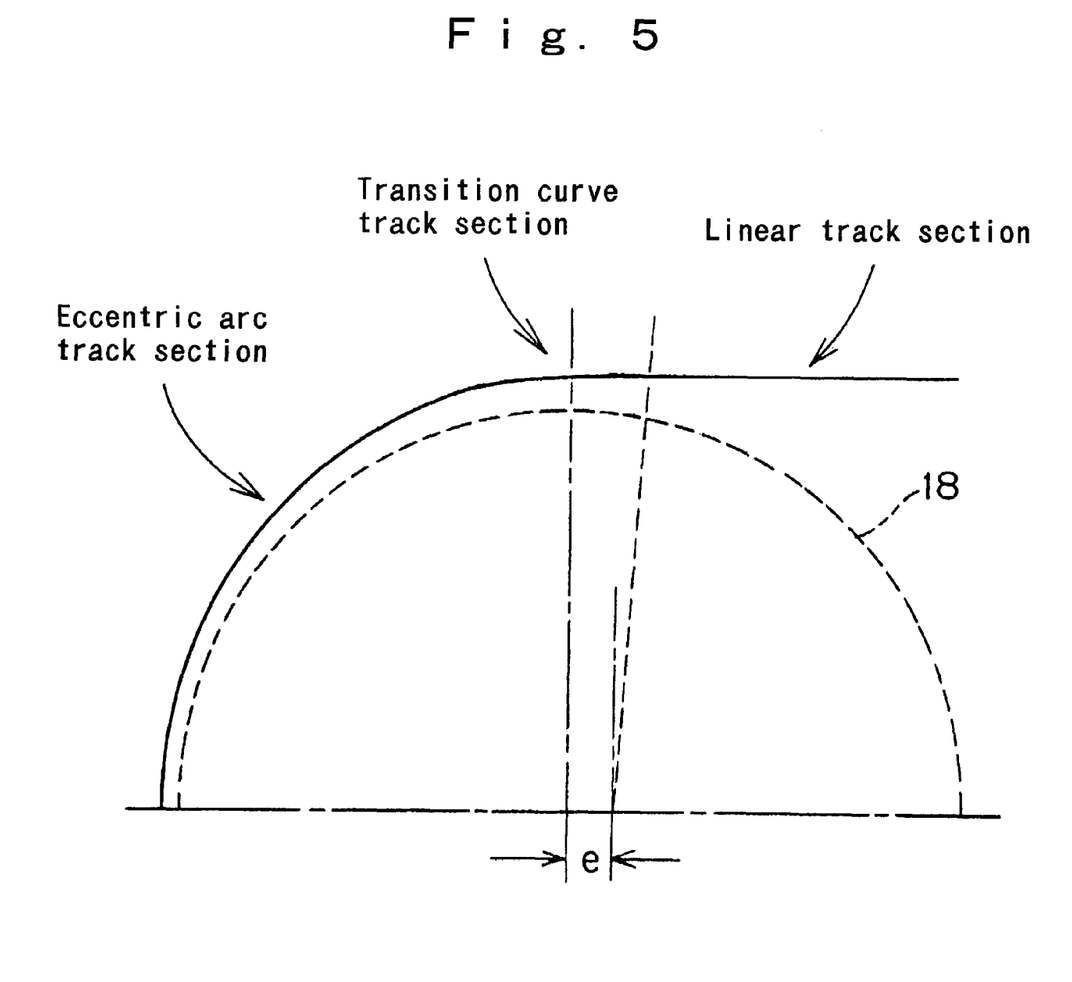
FIG. 5 is a schematic view showing the track of a chain roller center as a chain approaches and travels around a sprocket according to the invention.

FIG. 5 illustrates track of travel of the center of the roller relative to the tooth gap bottom circle 18, as the roller approaches and moves around the sprocket. As shown in FIG. 5, as a roller moves around the sprocket, the contact position moves toward the center portion of a tooth gap bottom, and consequently, the roller first travels first along a linear track section, and then along a transition curve track section to an eccentric arc track section.

As shown in FIG. 2, in the linear track section L12, the roller 9 contacts a back tooth surface 14 in the vicinity of the tooth head. As the roller approaches the engagement portion 19, the center of the roller travels along a linear track L11, which is an extension of linear track L12. After engagement, as the contact position 20 between the roller 9 and the tooth surface 14 gradually moves toward the tooth gap bottom, the center of the roller traces a transition curve, and then an eccentric arc as the contact position 20 moves toward the center 17a of the tooth gap bottom. The letter "e" in FIG. 5 denotes the eccentricity of the eccentric arc track and the eccentric arc track may be an involute curve, a parabola, or an oval.

When the center portion 17a of the tooth gap bottom is caused to coincide with the center portion 7a of a tooth gap bottom of an ISO tooth form, the tooth 12 is formed such that its thickness W, in the vicinity α2 of the intersection between included angle lines α1 of the tooth gap bottom arcs and tooth surfaces 13 and 14 is thinner than the tooth thickness w of the ISO tooth form, and the tooth thickness W of a portion from the thin portion to the tooth head 15 is thicker than the tooth thickness w of the ISO tooth form, and gradually becomes thinner, proceeding from the pitch line pc to the tooth head. Rollers 9 first come into contact with back tooth surfaces 14 at an engagement portion 19 so that the movement of the roller to the tooth gap bottom 17 is restricted. Thus the rollers 9 are linearly aligned on a linear track $L_{11}$, which is an extension of linear track $L_{12}$, so that polygonal movement of the chain 8 is suppressed. As a result, chordal vibration and intermittent changes in speed of the chain 8 are suppressed. Movement of the contact position 20 between the roller 9 and the tooth 12 proceeds smoothly toward the center portion 17a of the tooth gap bottom so that impact noise on engagement is also suppressed.

The thickness W of teeth 12 of the sprocket 11 is greater than thickness w of a tooth 2 of the ISO tooth form, and, at the same time, the height Ha of the tooth head is greater than the height ha of the tooth head of an ISO tooth form. Therefore, a roller 9 reliably comes into contact with a back tooth surface 14 in the vicinity of the tooth head 15 at the engagement portion 19. As a result, the chain 8 can be reliably maintained at the upper limit of polygonal movement and a polygonal movement of the chain on engagement is suppressed.

Although a roller chain has been described, the chain in the transmission can be a bushing chain, or a chain, having neither a roller nor a bushing, in which a pin comes into direct contact with the sprocket. In each case, when such a chain is used with a sprocket according to the invention, the same effects can be achieved as are achieved in the case when the sprocket is engaged with a roller chain.

The invention claimed is:

1. A power transmission comprising a chain engaged with a plurality of sprockets, wherein one of said sprockets is a driving sprocket having a plurality of teeth disposed circumferentially at intervals, adjacent teeth of said plurality having facing tooth surfaces and being connected by arc-shaped tooth gap bottoms, wherein the center of the tooth gap bottom corresponds with the center of the tooth gap bottom of a standard tooth form conforming to the formulae:

$$d=p/\sin(180°/z)$$

$$d_f=d-d_1$$

$$r_e(\max)=0.12d_1(Z+2)$$

$$r_i(\min)=0.505d_1$$

$$\alpha(\max)=140°-90°/z$$

$$r_e(\min)=0.008d_1(Z^2+180)$$

$$r_i(\max)=0.505d_1+0.069d_1^{1/3}$$

$$\alpha(\min)=120°-90°/z$$

$$\beta=360°/z$$

where
p is the chain pitch,
d is the diameter of the pitch circle,
$d_1$ is the outer diameter of the chain roller,
$r_1$ is the radius of the arc of the tooth gap bottom,
$r_e$ is the radius of the tooth surface
$d_f$ is the root diameter,
z is the number of sprocket teeth,
α is the roller seating angle, and
β is the tooth pitch angle,
the tooth thicknesses of inner portions of said teeth in the vicinity of the intersections of lines defining the angle subtended by the tooth gap bottom arcs of said standard tooth form with said tooth surfaces, is thinner than the tooth thickness of said standard tooth form, and the tooth thickness of outer portions of the teeth extending from said thinner inner portions to the tooth heads is thicker than the tooth thickness of said Se standard tooth form, and gradually becomes thinner, proceeding from the sprocket pitch line to the tooth heads, in which the sprocket pitch is greater than the chain pitch, and in which the tooth heads of said teeth are sufficiently high that, as each roller of a chain in mesh with said sprocket approaches the sprocket, said roller comes into contact with the back surface of a sprocket tooth before the roller contacts the arc-shaped tooth gap bottom of the sprocket, whereby the chain is reliably maintained substantially at the outer limit of polygonal movement as it approaches the sprocket.

* * * * *